United States Patent [19]

Reiner et al.

[11] 4,010,420
[45] Mar. 1, 1977

[54] SATELLITE COMMUNICATIONS TRANSMISSION APPARATUS AND METHOD

[75] Inventors: Udo Reiner; Jochen Zilg, both of Munich, Germany

[73] Assignee: Siemens Aktiengesellschaft, Berlin & Munich, Germany

[22] Filed: Jan. 13, 1975

[21] Appl. No.: 540,548

[30] Foreign Application Priority Data

Jan. 14, 1974 Germany .......................... 2401604

[52] U.S. Cl. ............................ 325/4; 325/58; 178/69.1; 179/15 BS; 343/179

[51] Int. Cl.² ........................................... H04B 7/19

[58] Field of Search ............. 325/4, 58; 179/15 BS; 343/176, 178, 179; 178/69.5 R

[56] References Cited

UNITED STATES PATENTS

| | | | |
|---|---|---|---|
| 3,418,579 | 12/1968 | Hultberg | 325/4 X |
| 3,530,252 | 8/1970 | Puente | 179/15 BS |
| 3,532,985 | 10/1970 | Glomb et al. | 343/179 X |
| 3,626,295 | 12/1971 | Sabrui | 325/4 |
| 3,795,772 | 3/1974 | Hill et al. | 179/15 BS |
| 3,813,496 | 5/1974 | Maillet | 179/15 BS |
| 3,836,721 | 9/1974 | Sugioka | 179/15 BS |
| 3,843,843 | 10/1974 | Solomon et al. | 179/15 BS |

*Primary Examiner*—Robert L. Richardson
*Assistant Examiner*—Michael A. Masinick
*Attorney, Agent, or Firm*—Hill, Gross, Simpson, Van Santen, Steadman, Chiara & Simpson

[57] ABSTRACT

A satellite communication system wherein transmissions from a plurality of ground stations are transmitted via a satellite in a time-multiplex manner and where each station is assigned a particular time slot wherein for synchronizing a ground station into its time slot there is provided a time synchronizing means which first synchronizes the initial portion of the incoming stations transmission to a time delayed from its desired time after which when the signal has been accurately positioned to such delayed time it is shifted a pre-set time in its time slot such that the transmission from said incoming ground station is accurately positioned at its correct time slot.

6 Claims, 7 Drawing Figures

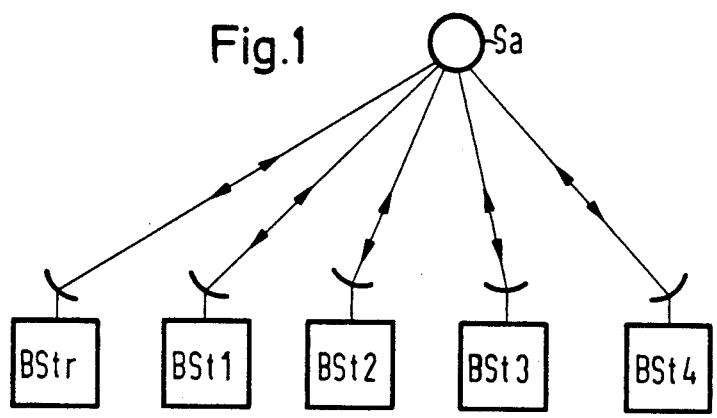
Fig.1
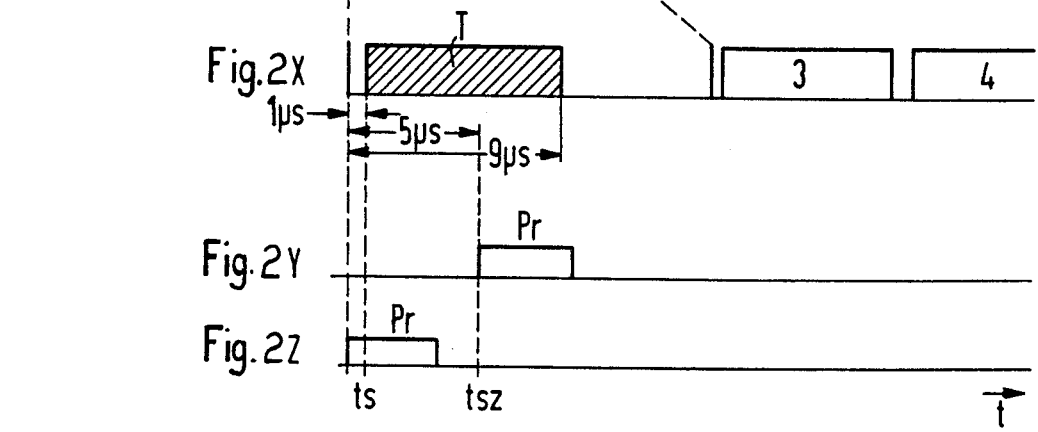

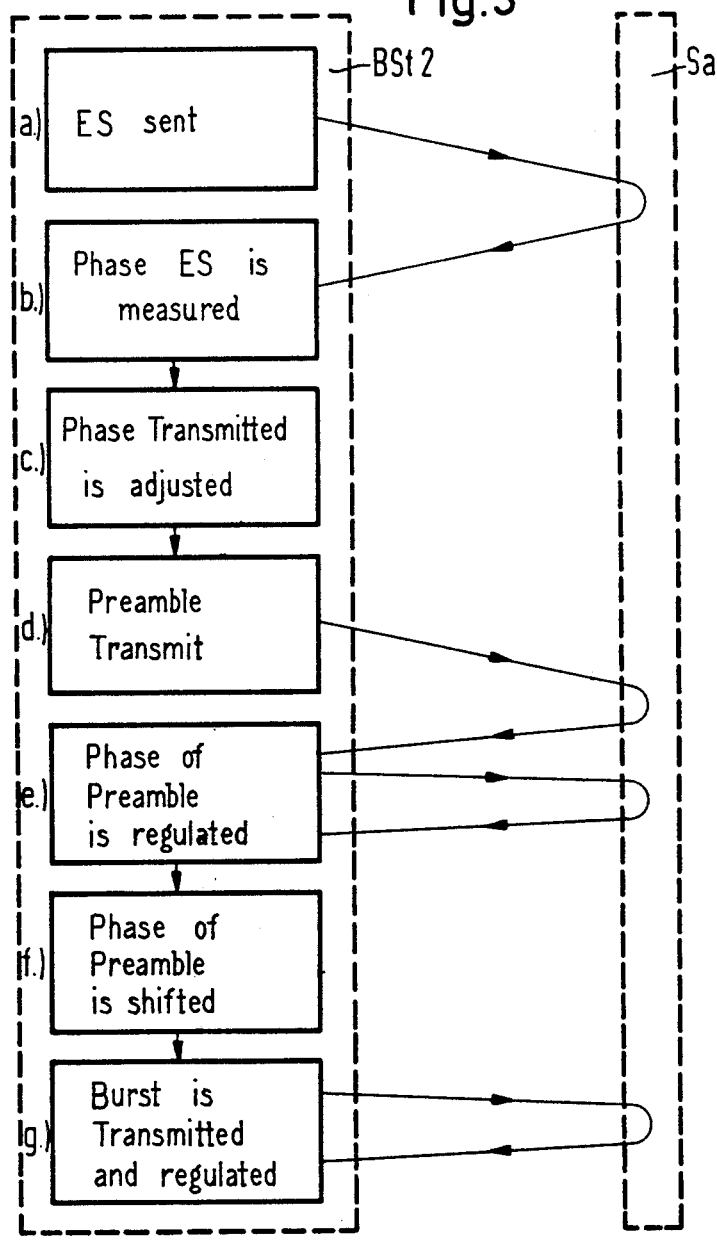

SATELLITE COMMUNICATIONS TRANSMISSION APPARATUS AND METHOD

BACKGROUND OF THE INVENTION

1. Field of the Invention

This invention relates in general to satellite communication systems and in particular to a novel method and apparatus for synchronizing a ground station in its assigned time slot.

2. Description of the Prior Art

Communication satellite transmission systems are known wherein a time-multiplex arrangement is utilized with each ground station assigned to a particular time slot. For example, German Pat. No. 2,020,094 discloses a system wherein during the initiation of transmission by a new ground station to the TDMA signal first the satellite path is measured utilizing the measuring signal. Such measurement is accomplished such that the incoming station transmits an initial access signal having a period of duration which is usually identical with the duration of the TDMA frame signal. In order to prevent interference between the useful signals and the initial access signal, the initial access signal must be maintained at a level below that of the useful signals. Normally, the access signal is maintained at a level of 25 db below the useful signals. The incoming station receives from the satellite is transmitted access signal and the position of the initial access signal can then be determined by the ground station within the frame and the phase deviation from the desired phase of the subsequent signals which are to be sent can be obtained from this phase measurement. Generally, only the preamble of the ground station is first transmitted utilizing the phase found in this manner, and the initiation of this signal is adjusted with a phase control device in the ground station over the control loop of which the satellite forms a part until the preamble is accurately adjusted in phase to the desired phase. Thereafter, periodically during the time slot for the particular station the entire transmission of the station follows the preamble. The phase control device for the transmission is relatively inexpensive in that it is also required to maintain the transmissions in their proper time slots under steady operation. This is necessary even though a satellite which moves synchronously with the earth rotation, does not remain absolutely stationary but has noticeable movements in all three spacial planes.

In the systems of satellite communication transmission systems, utilizing the TDMA technique, it is desirable to permit the transmission of bursts as quickly and accurately as possible after the initial phase-deviation measurement of the initial access signal has been accomplished. The time, which is required for carrying out the initial access depends on the transmission time of the initial access signal in one case and in the other case on the required time duration to accomplish phase correction after which the complete transmission including intelligence can occur.

In presently operating systems, the transmission time of the initial access signal generally requires three seconds and this time cannot as a practical matter, be shortened due to the relatively long transit time which is in the order of magnitude of a few hundred milliseconds which is required for the initial access signal to pass to the satellite and be received back at the transmitting ground station. The time required for the phase correction before the full intelligent burst can be transmitted, however depends on the accuracy of the phase-deviation measurement at the receiving side and the time required for the accessing station to correct the desired phase. The precision depends on the structure of the initial access signal, on the time available for the initial access process and on the signal level difference between the useful signals and the initial access signal. In the Intelsat IV test system, the minimum phase measuring accuracy $\pm$ 4 microseconds has been determined.

As mentioned above, after the initial transmission phase correction has been made, only the burst preamble is transmitted and the transmission phase regulation is accomplished with this signal. It has been determined with a test system that there are maximum phase-change speeds that can be utilized for safety reasons and it has been determined that the phase correction speed must be limited and accomplished within the transmission phase fine adjustment. It has been determined that the phase correction steps should not exceed one unit per frame. It has also been determined that maximum of seven correction steps per three hundred ms dead time are to be accomplished when considering the transit time of the satellite loop. If the minimum measuring accuracy of measurement of the phase-deviation of the initial access signal is $\pm$ 4 microseconds, a time up to 13 seconds will be required for the burst transmission phase adjustment. This value may be greater if possible phase changes must be compensated which occurred during this time due to generator drift.

SUMMARY OF THE INVENTION

The present invention relates to an improved communication satellite system wherein the initial access and adjustment of the incoming station is substantially reduced because the time for the phase correction and thus the time for the initial access is substantially reduced.

In a satellite communication system wherein the signals originating at different ground stations are provided with a preamble and are each assigned a different time slot and wherein the signal is combined in a time-multiplex arrangement to become a frame on the satellite side and are then retransmitted (TDMA) and where in order to carry out an initial access of a ground station the ground station transmits an initial access signal then the position of such signal is evaluated in the receiving frame so as to adjust the desired phase position of the burst of the accessing ground station is solved by the present invention. Furthermore, the given phase position of the burst transmitted is controlled within the assigned time slot by utilizing a burst transmission phase control. In the present invention, after the phase of the initial access signal is evaluated, the transmission phase is fixed to a desired intermediate time or phase which is delayed with respect to desired phase or time by a fixed amount. Then the subsequently transmitted burst preamble is adjusted very accurately to this desired intermediate time or phase in a first step utilizing the stations burst transmission phase control. After a signal has been very accurately adjusted to the intermediate time or phase position, it is then stepped or adjusted to the desired phase from the desired intermediate phase in a programmed controlled manner after which the entire burst signal from the accessing ground station can be transmitted.

The invention is based on the fact that to tune and adjust the transmission phase of an accessing signal to a desired intermediate phase which is delayed with respect to the desired phase allows the tolerance range and the measuring accuracy while obtaining the phase deviation with the use of the initial access signal to be substantially reduced and further substantially reduces the time for accomplishing the phase correction until the full burst transmission. Furthermore, the additional time which is required to eliminate the phase delay before the burst transmission can be maintained within very narrow boundaries and the phase correction can be accomplished utilizing a program control wherein the satellite loop is not included in the controlled loop.

The conditions of the present invention become particularly favorable when the phase delay for the desired intermediate phase is selected to be approximately half the tolerance width of the phase-measuring precision of the initial access signal. In the case of a preferred sample embodiment, used with the Intelsat IV prototype system the phase delay of the desired intermediate phase with respect to the desired phase was selected to be 5 microseconds and the tolerance with the phase measuring period of the initial access signal is 8 microseconds with a tolerance range of +1 through +9 microseconds with respect to the desired phase.

The program controlled correction of the desired intermediate phase to the desired phase can be accomplished at a speed which is equal to a phase correction per frame of the burst transmission phase regulation.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

BRIEF DESCRIPTION OF THE DRAWINGS

FIG. 1 is a schematic representation of a satellite communication transmission system utilizing a satellite and several ground stations.

FIG. 2 is a time diagram for use in illustrating the initial access of a ground station to the system.

FIG. 3 is a flow diagram illustrating the execution of an initial access, and

FIG. 1 illustrates a satellite $Sa$ moving above the surface of the earth in a rotational path, synchronous with the ground. The satellite $Sa$ includes suitable antenna and receiving and transmitting equipment so that it can serve as a relay station between one or more of a plurality of ground stations $BStr$, $BSt1...BSt4$. As illustrated, each of the ground stations is provided with a suitable antenna for communication between the ground station and the satellite $Sa$.

Figure 4:
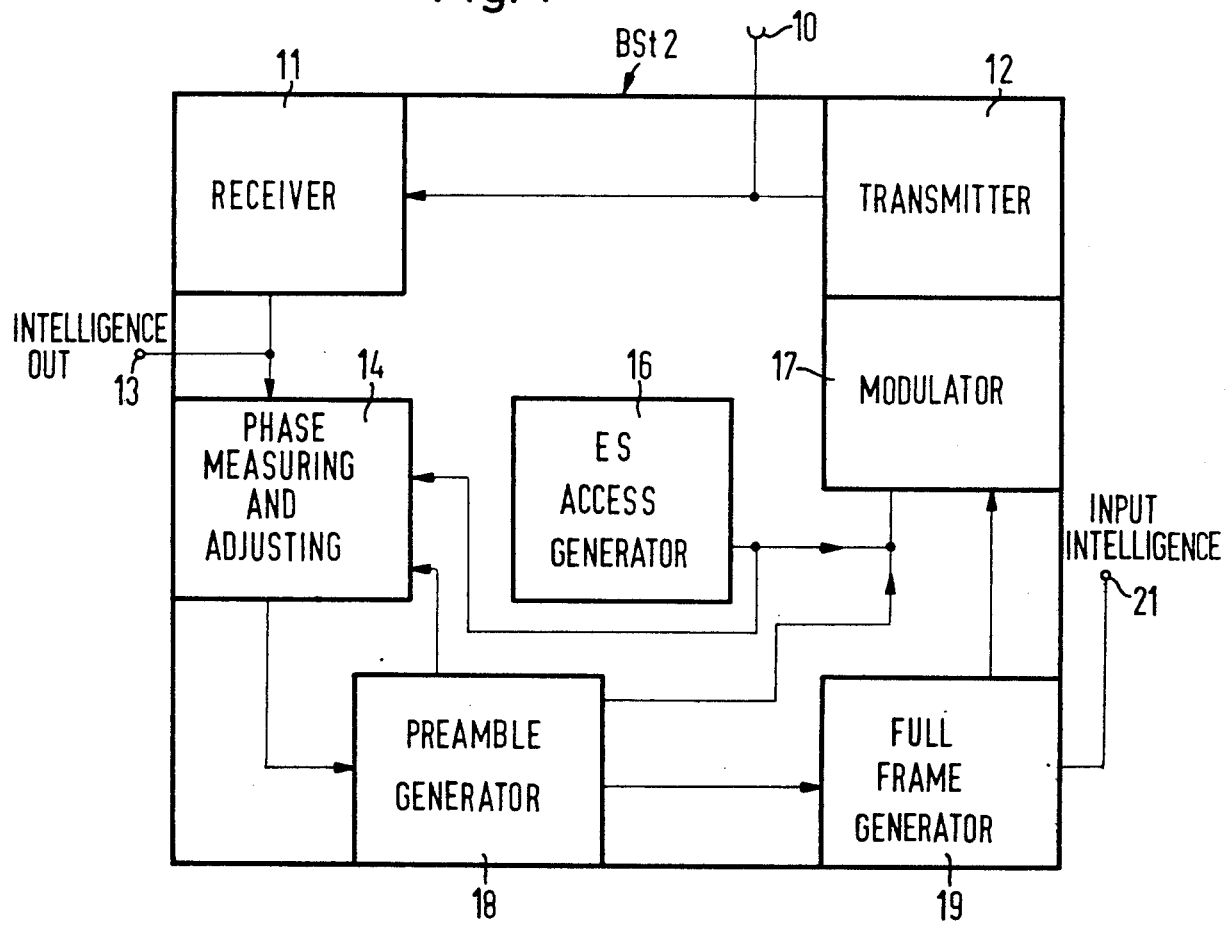
FIG. 4 is a block diagram illustrating a ground station.

Each of the ground stations when in operation, is assigned a particular time slot in a frame period $\tau$. The burst which each station radiates during its particular time slot consists of a preamble and subsequent signal channels. The preamble is utilized for identifying the transmitting as well as the called station and is also utilized for synchronizing and phase adjustments and the signal channels are utilized for the transmission of intelligence. The individual ground stations can communicate with one another via the satellite in the system illustrated in FIG. 1 and each station transmits its particular burst within its assigned time slot and each of the time slots are mutually separated by protective times so as to assure that the bursts of a particular ground station which all utilize the same carrier do not overlap in time.

FIG. 2 W illustrates a frame wherein the transmission of the first station $BStr$ occurs during the first time slot, $r$ at the start of the frame and the other ground stations are assigned time slots such as 1, 3 and 4 which are respectively assigned to stations $BSt1$, $BSt3$ and $BSt4$ respectively. It is to be noted that a gap L occurs between time slots 1 and 3 which indicates that the ground station $BSt2$ is not transmitting a signal in its assigned time slot at the particular time. FIGS. 2 X, 2 Y and 2 Z illustrate a portion of the frame from FIG. 2 W wherein the time axis has been substantially expanded for purposes of explanation.

FIG. 3 is a flow diagram illustrating how the initial access of ground station $BSt2$ is accomplished.

In FIG. 3, the ground station $BSt2$ and the satellite $Sa$ are each illustrated in dashlines. When the station $BSt2$ wishes to obtain access to the communication system it transmits during initial period a an access signal ES to the satellite $Sa$. The receiver of the satellite receives such signal and provides it to the satellite transmitter which re-radiates it to station $BSt2$ where it is received by the receiver of station $BSt2$ and the phase of the access signal ES is measured so as to determine its phase deviation from the desired phase. It is to be realized, of course, that the station $BSt2$ is continuously receiving the frame signal illustrated in FIG. 2 W and can use such signal to measure the phase deviation of the access signal ES from its desired phase. It is to be realized that the phase deviation of the access signal ES is measured after the initial access signal has passed through the satellite loop. FIG. 2 X illustrates the tolerance range by the width T which is the accuracy of measuring for obtaining the phase deviation of the initial access signal ES from the desired phase and the width T is shown in cross-hatch. The boundaries of the tolerance range T with respect to the desired phase $ts$ extend from +1 microseconds to +9 microseconds as shown in FIG. 2 X.

The phase deviation of the initial access signal ES which is measured in part $b$ of the flow diagram as shown in FIG. 3 is evaluated such that the transmission phase for the desired intermediate phase position $tsz$ which is delayed with respect to the desired phase $ts$ for 5 microseconds is adjusted in part $c$ of the flow diagram as shown in FIG. 3. It is to be realized that part $b$ can indicate to part $c$ either the desired intermediate time or phase or the desired phase or time. If the desired phase or time is supplied to part $c$ from part $b$ the correction of 5 microseconds must be made in part $c$.

As shown in FIG. 3, the transmitted preamble signal Pr has been transmitted from the accessing station transmitter from part $d$ which is keyed by part $c$ and such signal passes to the satellite which re-radiates back to the ground station $BSt2$ wherein it is regulated in time or phase to the value of the desired intermediate phase $tsz$ such that the leading edge of the preamble signal Pr is adjusted to the intermediate phase position $tsz$ as shown in FIG. 2 Y by the phase control in part $e$. The fine adjustment of phase is accomplished step by step including the satellite loop in the control loop.

As soon as the fine adjustment is completed, the part f shifts the preamble Pr from the intermediate desired phase tsz to the desired time position ts. Since it is known that the desired intermediate phase position tsz differs from the desired phase position ts by 5 microseconds, this adjustment can be made under the control of a program which exactly advances the phase by 5 microseconds in the negative direction. This is possible since the preamble signal Pr in part e has been finally adjusted to phase value tsz which is delayed by 5 microseconds from the desired position ts as shown in FIGS. 2 X, 2 Y and 2 Z. FIG. 2 Z for example shows the preamble signal shifted to the position ts.

The program controlled phase shift of 5 microseconds is advantageously accomplished in phase correction steps per frame which can be accomplished by the burst transmission phase control, which can carry out this phase shift and even during continuous operation of the system continues control of the given burst phase can be accomplished. Part f in FIG. 3 illustrates the shifting of the preamble to the position ts and after the shift has been accomplished the output of part f is supplied to part g wherein the full transmission in the time slot assigned to station BSt2 of the frame period τ completes the initial access of ground station BSt2 to the communications system.

It has been found that utilizing the method and apparatus of the invention, the maximum time for obtaining initial access of an incoming ground station can be reduced from approximately 16 seconds to 9 seconds and these results have been verified with the Intelsat IV specification.

FIG. 4 illustrates in block form ground staton BSt2 which includes an antenna 10 which is connected to a receiver 11 and a transmitter 12. Incoming signal from the satellite Sa is supplied from the antenna 10 to the receiver 11 and the output of the receiver 11 is connected to an intelligence output terminal 13 and to a phase measuring and adjusting unit 14. An access generator 16 produces a suitable access signal ES when it is desired to connect the station BSt2 to the communications system. Access generator 16 supplies an output to a modulator 17 which modulates transmitter 12 which is connected to antenna 10. The radiated signal from transmitter 12 passes to the satellite which receives and re-radiates it where it is received at antenna 10 and supplied to the receiver 11 and the phase measuring and adjusting circuit 14. The phase measuring and adjusting circuit 14 also receives an input from the access generator 16 and keys a preamble generator 18 which supplies an output to the modulator 17. The preamble signal is supplied to the transmitter 12 from the modulator 17 and radiated to the satellite and returned to the antenna 10 and then supplied from the receiver 11 to the phase measuring and adjusting circuit 14 which controls the phase of the output at preamble generator 18 to the time position tsz. After the preamble signal is accurately positioned to the position tsz the phase measuring and adjusting circuit 14 shifts it 5 microseconds to the position ts as illustrated in FIG. 2 Z after which time the preamble generator 18 supplies a key signal for the full frame generator 19 which also receives input intelligence at terminal 21 and supplies an input to the modulator 17.

It is seen that this invention provides a rapid and novel method and apparatus for synchronizing a station in a communication network wherein the incoming station is initially synchronized to an intermediate reference time position after which the phase shift is shifted a predetermined time to the desired position. The invention allows greatly increased speed of synchronization of stations.

We claim as our invention:
1. A method of satellite communication whereby signal transmission bursts of different ground stations are provided with a preamble and are arranged in a time-multiplex manner and are combined to form a frame at the satellite station and are re-transmitted comprising the steps of transmitting an initial access signal by a ground station, receiving and retransmitting said access signal by said satellite station, receiving said access signal at said ground station and evaluating its position in the frame assigned to said ground station, adjusting the phase position of a preamble transmit burst which is to be transmitted by said accessing ground station and the phase position of the preamble transmit burst controlled with respect to its desired phase position by using burst phase regulation control, and evaluating the initial access signal and controlling the transmission phase to a desired intermediate phase position which is delayed with respect to the desired phase by a known time and shifting the phase with a program control of the preamble transmit burst to the desired phase position from the desired intermediate phase position and then transmittng the entire burst.

2. The method of satellite communication of claim 1 wherein said program control makes a correction of the desired intermediate phase to obtain the desired phase position at a speed which is equal to a phase-correction step per frame of the burst-transmission phase regulation control.

3. The method of satellite communication of claim 1 wherein the phase delay of the desired intermediate phase position relative to the desired phase position is selected to be approximately equal to one half the tolerance width of the phase-measuring precision of the initial access signal.

4. The method of satellite communication of claim 3 wherein the phase delay of the desired intermediate phase position relative to the desired phase is 5 microseconds for a tolerance width of the phase measuring precision of the initial access signal of 8 microseconds in a tolerance range of +1 microsecond through +9 microseconds with respect to the desired phase.

5. In a satellite communications system comprising a number of ground stations having transmitters and receivers and at least one satellite with a receiver and transmitter and wherein communication between the ground stations via the satellite is accomplished with a single carrier by assigning different time slots in an information frame to each station comprising means at each station for controlling its transmission in its assigned time slot including means at each ground station for sending an initial access signal to said satellite and receiving said signal from said satellite comprising, receiving and transmit means in each ground station, an access generator in each ground station connected to said transmit means and supplying an access signal thereto, a phase measuring and adjusting means in each ground station connected to said receiving means to adjust the phase of transmitted signals to an intermediate phase position, a preamble generator connected to said phase measuring and adjusting means and to said transmit means to radiate a preamble signal to said satellite receiver which furnishes it to the satellite transmitter, said receiving means at said ground station receiving said preamble signal from said satellite transmitter, said phase measuring and adjusting means controlling the phase of said received preamble signal to said intermediate phase position, and then shifting said preamble signal to the desired phase position and keying said transmit means so that transmission by said ground station starts at said desired phase position.

6. In a satellite communications system according to claim 5 wherein the time between said desired intermediate phase position and said desired phase position is 5 microseconds.

* * * * *